3,415,701
METHOD FOR GLAZING A METAL FRAME
John Haldane, Midlothian, and Brian Ashworth, Edinburgh, Scotland, assignors to Uniroyal Limited, a corporation of Scotland
No Drawing. Filed Feb. 11, 1965, Ser. No. 431,973
Claims priority, application Great Britain, Apr. 9, 1964, 14,817/64
2 Claims. (Cl. 156—244)

ABSTRACT OF THE DISCLOSURE

A method of glazing a metal frame comprises extruding a bead of polyurethane mastic between the frame and the marginal face portion of an adjacent glass panel and then curing the mastic. The glass panel is spaced from the frame by the use of temporary spacer members.

---

This invention relates to the mounting of glass window panels into frames and has particular reference to the mounting of windscreens and rear windows on vehicle bodies.

It has long been conventional practice to furnish windscreens and the like with an edge strip whereby the glass may be sealed into the respective opening in a water-tight manner without rigidly binding the glass to the frame. More recently, it has been proposed to dispense with this edge strip and instead secure the glass adhesively into its frame by means of a curable adhesive mastic such as one based upon a polysulphide rubber, resilient spacer pads being interposed between the frame and the glass with a view to predetermining the minimum thickness of mastic between the glass and the frame. Polysulphide based mastics exhibit cold flow even when cured, and for this reason it is necessary that the spacer pads, one or more of which will generally support the bottom edge of the glass, be left permanently in position.

It is an object of the present invention to simplify the glazing of windows into metal frames by means of adhesive. It is another object to provide a method of adhesively glazing a metal frame, in such a manner that permanent spacer blocks are unnecessary.

The invention consists, broadly, in a method of glazing a metal frame which comprises bonding a marginal face portion of a glass panel to an opposed face of the metal frame by means of a bead of a mastic having a polyurethane base, and curing the mastic or permitting it to cure under conditions leaving a substantial thickness of resilient cured mastic between said faces.

To facilitate the positioning of the glass and to hold it while the mastic is curing, temporary locating blocks and/or spacer clips may be used around the periphery of the glass or frame and can be removed when the cure has progressed sufficiently. Indeed, in general, the locating blocks and/or spacer clips may be removed as soon as the glass has been fully pressed home to the extent permitted by the blocks and/or clips. The latter may if desired be pre-coated with a suitable release agent such as polyethylene.

As already mentioned, the invention has particular reference to the mounting of windscreens in motor vehicles. These vehicles will generally have a complete windscreen opening, having a marginal portion of the car body work extending generally in the plane of the opening. Spacer clips may be positioned around this edge, comprising a channel portion which will embrace the free edge of the metal and a leg which will stand up at right angles to the plane of the window opening to the height at which it is desired the glass should be spaced away. A bead of polyurethane mastic will be extruded around the marginal face of the glass at a position where the upstanding legs will not be embedded as the glass is properly positioned and pressed home. It will not matter if, when the bead of mastic (which will generally be triangular in section upon original application) becomes deformed it presses against the clip legs as this will not prevent the clips from being pulled away inwardly. In addition to the clips or instead of them, temporary spacer blocks may be inserted to locate the glass, conveniently being positioned between the outer edge of the glass and the metal frame, to be withdrawn outwardly when the cure has advanced sufficiently.

The mastic may be cold cured, in which case it will be prepared shortly before its application to the glass, or it may be cured at an elevated temperature. A two-component system, comprising respectively a prepolymer and an activator, will normally be employed, these being mixed shortly before use. The resulting mixture will normally be cold setting, and there will in some cases be advantage to be had by promoting the mastic to set at room temperature instead of heating it to accelerate the cure because in the latter case, the mastic will pass through a phase in which it is softer than it would have been had it been left at room temperature. On the other hand, the glass may be located temporarily as already indicated, in which case heat may be resorted to as a method of accelerating the cure if desired. The prepolymer may be formed by reacting a polyether and/or a polyester resin with a polyisocyanate in excess, toluene diisocyanate being suitable for this purpose. The activator may comprise a polyether resin which reacts with the excess isocyanate of the prepolymer. Fillers and thixotroping agents may be present, as well as a catalyst. The latter may be incorporated with the activator.

Having thus described our invention, what we claim and desire to protect by Letters Patent is:

1. A method of glazing a metal frame comprising the steps of: positioning a plurality of temporary spacer members around the periphery of said frame; positioning a glass panel adjacent said frame with a marginal face portion of said panel spaced from said frame by said temporary spacer members; extruding a bead of polyurethane mastic between said frame and said marginal face portion of said panel; and curing said mastic.

2. The method of claim 1, further comprising the step of removing said spacer members prior to final curing of said mastic.

References Cited

UNITED STATES PATENTS

| | | | |
|---|---|---|---|
| 3,108,338 | 10/1963 | Stec et al. | 49—479 X |
| 3,347,008 | 10/1967 | Strengholt | 52—616 X |
| 3,360,351 | 12/1967 | Murray et al. | 52—616 X |
| 3,367,816 | 2/1968 | Mills et al. | 156—244 X |
| 3,372,083 | 3/1968 | Evans et al. | 156—331 X |
| 2,722,978 | 11/1955 | Frisk | 49—479 X |
| 2,728,702 | 12/1955 | Simon et al. | 244—126 |
| 2,767,443 | 10/1956 | Hobein et al. | 52—616 X |
| 2,768,475 | 10/1956 | Seelen et al. | 52—616 X |
| 2,974,377 | 3/1961 | Kunkle | 52—616 |
| 3,030,249 | 4/1962 | Schollenberger et al. | 161—190 |
| 3,218,215 | 11/1965 | Achterhof et al. | 161—190 X |

HAROLD ANSHER, *Primary Examiner.*

U.S. Cl. X.R.

156—293, 331; 161—190, 195, 219; 52—620; 49—479, 499